United States Patent [19]

Grimes

[11] Patent Number: 4,723,349

[45] Date of Patent: Feb. 9, 1988

[54] METHOD OF MAKING FIXTURE FOR THE WINDOW OF A MAGNETIC CORE

[75] Inventor: Frank H. Grimes, Athens, Ga.

[73] Assignee: Westinghouse Electric Corp., Pittsburgh, Pa.

[21] Appl. No.: 896,782

[22] Filed: Aug. 15, 1986

[51] Int. Cl.[4] .................. B23Q 17/00

[52] U.S. Cl. .................. 29/407; 29/450; 29/463; 29/606; 29/609; 138/162; 174/101; 336/210; 336/217

[58] Field of Search .................. 29/609, 606, 453, 463, 29/450, 407; 174/101; 336/199, 208, 210, 217; 138/162

[56] References Cited

U.S. PATENT DOCUMENTS

| | | | |
|---|---|---|---|
| 906,953 | 12/1908 | Sperry | 138/162 |
| 1,044,044 | 11/1912 | Hardesty | 174/101 X |
| 1,239,223 | 9/1917 | Ross | 29/453 UX |
| 2,958,060 | 10/1960 | Kalb | 336/210 |
| 3,348,276 | 10/1967 | Miknaitis | 336/210 X |
| 3,420,032 | 1/1969 | Felt | 29/464 X |
| 3,433,270 | 3/1969 | Fischer et al. | 174/101 X |
| 3,763,544 | 10/1973 | Gibson, Jr. | 29/407 |
| 4,462,145 | 7/1984 | Schulze | 29/450 X |
| 4,615,106 | 10/1986 | Grimes et al. | 29/609 X |
| 4,649,640 | 3/1987 | Dto et al. | 29/606 X |

FOREIGN PATENT DOCUMENTS

| | | | |
|---|---|---|---|
| 1009297 | 11/1965 | United Kingdom | 138/162 |

*Primary Examiner*—Charlie T. Moon
*Attorney, Agent, or Firm*—D. R. Lackey

[57] ABSTRACT

A fixture for defining the window of a jointed magnetic core, which core is constructed of amorphous metal alloy, and methods of constructing such a fixture. The fixture includes first and second substantially U-shaped metallic frame members which are easily and quickly assembled with interlocking joints which positively maintain the desired geometric configuration of the core window, as well as the peripheral dimension thereof. Notwithstanding the high mechanical strength of the fixture, the interlocking joints are easily unlocked, which feature is necessary as the fixture will be required to be assembled, disassembled, and reassembled a part of the normal processing of the magnetic core. New and improved methods of constructing the fixture enable the same tooling to be used for different sizes of fixtures, which are required to cover the range of transformer ratings the magnetic cores will be an integral part of.

4 Claims, 8 Drawing Figures

METHOD OF MAKING FIXTURE FOR THE WINDOW OF A MAGNETIC CORE

BACKGROUND OF THE INVENTION

1. Field of the Invention

The invention relates in general to magnetic cores for electrical inductive apparatus, such as distribution transformers, and more specifically to a new and improved support fixture for defining the window of a magnetic core constructed of amorphous metal alloy.

2. Description of the Prior Art

Amorphous metal alloys, such as Allied Metglas Product's 2605SC and 2605S-2, exhibit a relatively low no-load loss when used in the magnetic core of an electrical transformer. Co-pending application Ser. No. 896,781, filed Aug. 15, 1986, entitled "Method of Making a Magnetic Core", which is assigned to the same assignee as the present application, discloses new and improved methods of constructing magnetic cores of such amorphous material. The new and improved methods include utilizing the extreme flexibility of an amorphous core, normally considered a manufacturing problem, to aid in providing an openable joint in the core. The amorphous magnetic core, which is wound in a round configuration in a preferred embodiment of the co-pending application, is cut to provide a plurality of cut lamination turns, and the cut lamination turns are assembled about a substantially rectangularly shaped fixture. A joint is formed in the assembled lamination turns to form a closed loop, and the rectangularly shaped core loop is subjected to a stress-relief anneal heat treatment cycle to remove winding induced and shaping stresses from the cut lamination turns. After the heat treatment cycle, the core joint is opened and the fixture which defines the core window is disassembled to the point where pre-formed electrical coil assemblies, which include high and low voltage windings, may be slipped over leg portions of the magnetic core loop. The window fixture is then reassembled, and the core joint rebuilt about the fixture. The fixture remains in the assembled core-coil assembly. The hereinbefore mentioned co-pending application is hereby incorporated into the specification of the present application by reference.

It is of critical importance that the periphery of the window fixture be the same as the periphery of the winding mandrel upon which the core loop was originally wound, within a predetermined small tolerance. This critical dimension must be held and maintained each time the fixture is assembled, notwithstanding the fact that the fixture has been subjected to a heat treatment cycle along with the amorphous alloy. The fixture just be rigid and have a high mechanical strength, to enable the core loop to be formed about about the fixture with a good space factor, in effect using the fixture as a forming tool. The fixture must provide precise control over the corner dimensions of the substantially rectangularly shaped core loop, while being quickly and easily assembled and disassembled. The fixture must be easily and quickly manufacturable to different dimensions using the same tooling, in order to economically accmmodate different sizes of magnetic cores for use in transformers of different power ratings. Finally, since the fixture is not reused, but is an integral part of a completed transformer, it must provide all of the above characteristics while being manufacturable at a very low cost.

SUMMARY OF THE INVENTION

Briefly, the present invention is a new and improved fixture for defining the window opening of a magnetic core constructed of amorphous metal alloy, and methods of constructing same. Broadly, the new and improved fixture is a sheet metal frame constructed of two substantially U-shaped members which are cooperatively joined with interlocking joints which accurately repeat the desired peripheral dimension, and accurately hold the desired core window configuration, regardless of how many times the fixture is assembled and disassembled during the process of manufacturing a magnetic core of amorphous metal alloy about the fixture.

The new and improved fixture features interlocking joints each comprised of a tongue from one U-shaped member and a transverse slot in the other U-shaped member, with the tongue including a joggle and with the transverse slot being in a bent portion of its U-shaped member. An important key to dimensional stability and repeatability of the peripheral dimension and window configuration is the depth of the tongue joggle. This dimension determines the positions of the leg portions which are located immediately adjacent the tongues, on the bend radii associated with the slots which receive the tongues. This dimension also establishes and positively holds the dimension between the spaced leg portions of the U-shaped member which includes the slots.

Another important key to dimensional repeatability, as well as enabling fixtures to be quickly and easily manufactured to different dimensions for different core sizes while utilizing the same low cost tooling, are the tooling openings in each of the U-shaped members, with the only variable being the dimensions between pairs of such openings. The tooling indexes from the tooling openings to locate the joggle in the tongue, the bend which extends through a tongue receiving slot, and the bends which create the legs of the U-shaped configuration.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF THE PREFERRED EMBODIMENTS

Figure 1:
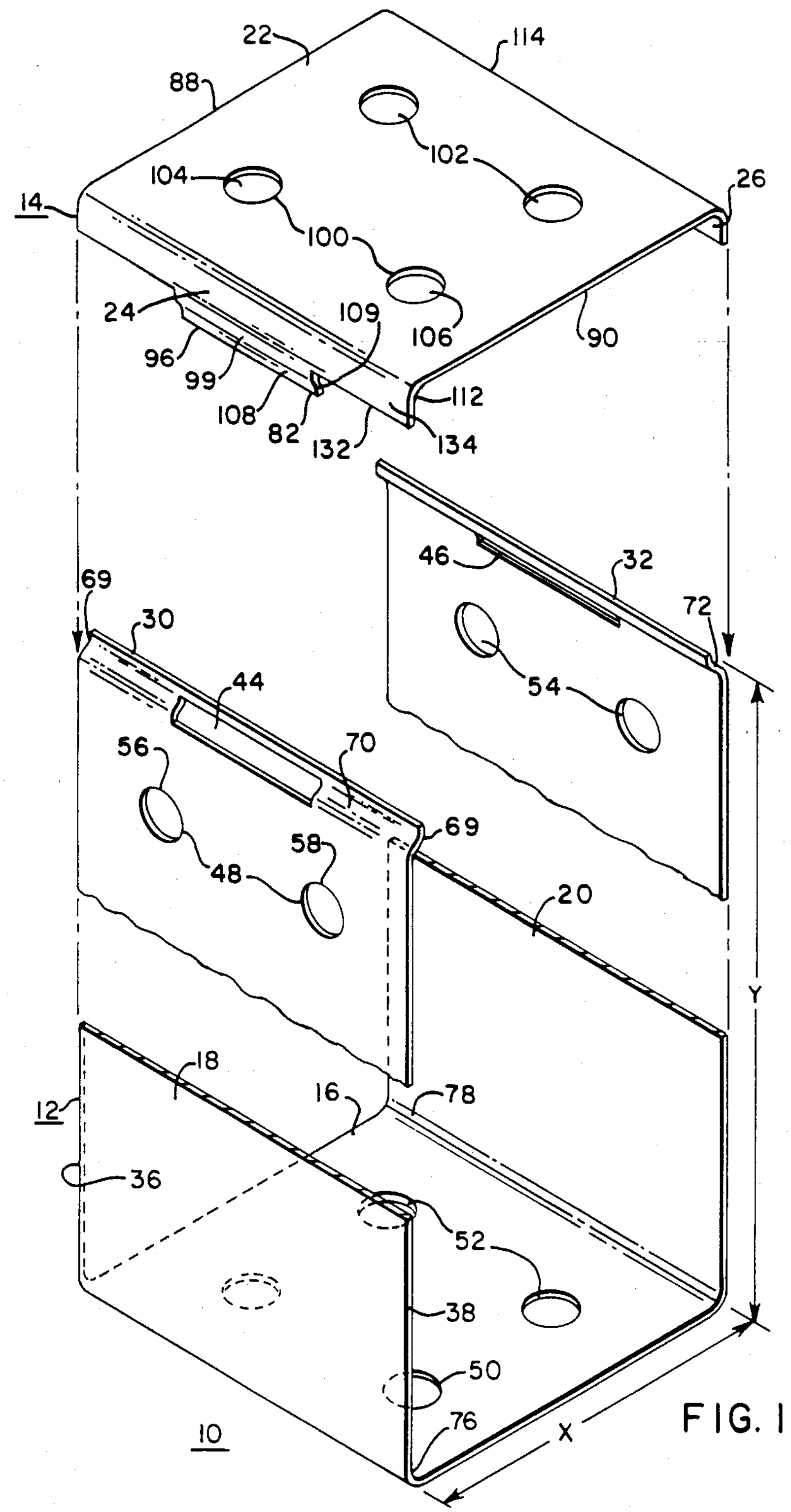
FIG. 1 is an exploded perspective view of a fixture comprising a U-frame and a cap constructed according to the teachings of the invention.

Referring now to FIG. 1 there is shown an exploded perspective view of a fixture 10 constructed according to the teachings of the invention. Fixture 10 includes first and second substantially U-shaped members 12 and 14, respectively. The first U-shaped member 12 will also be referred to as U-shaped frame 12, and the second U-shaped member 14 will also be referred to as cap 14.

The U-shaped frame 12 includes a bight portion 16, which will also be referred to as the lower yoke, and first and second spaced upstanding leg portions 18 and 20, respectively.

The cap 14 includes a bight portion 22, which will also be referred to as the upper yoke, and first and second depending leg portions 24 and 26, respectively. As will be hereinafter described in detail, the U-frame 12 and cap 14 are quickly and easily assembleable with interlocking joints to define a substantially rectangular configuration in which the U-shaped frame defines the lower yoke and substantially all of the leg portions of the configuration and the cap defines the upper yoke. The depending leg portions of the cap 14 are primarily for forming the interlocking joints, and for forming the upper corners of the fixture 10.

Figure 2:
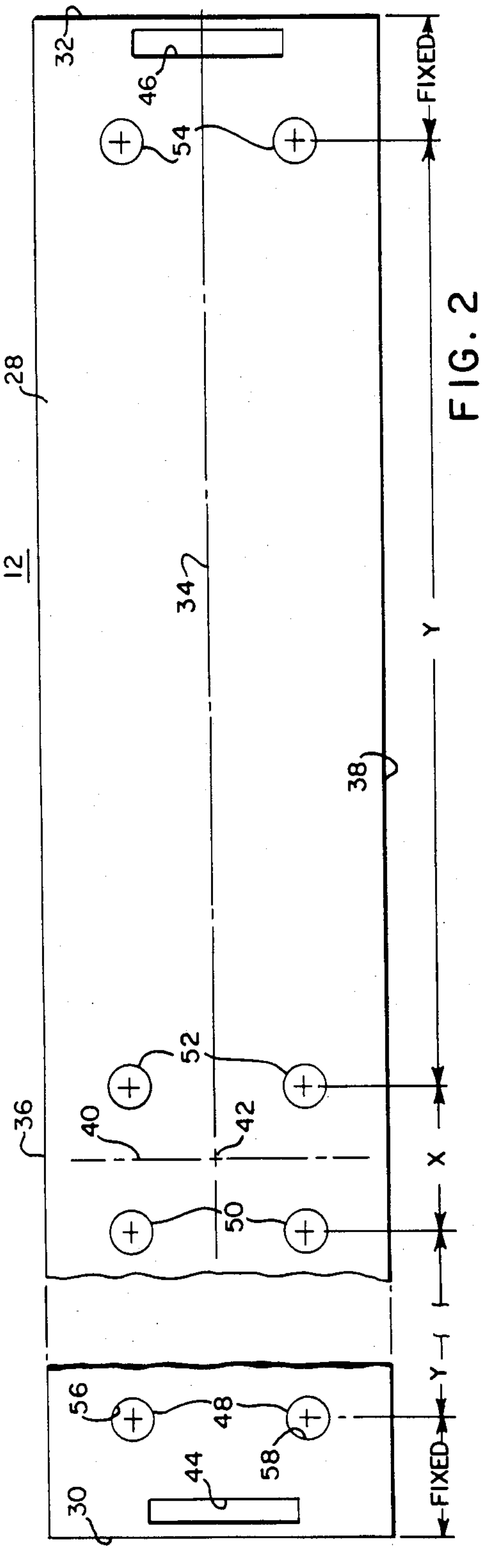
FIG. 2 is a plan view of the U-frame shown in FIG. 1, before it is bent into a U-shaped configuration.

FIG. 2 is a plane view of the U-shaped frame 12 before it is bent into the configuration shown in FIG. 1. U-shaped frame 12 is formed from a flat elongated sheet metal member 28, such as 0.075 inch thick carbon steel. Sheet metal member 28 has first and second ends 30 and 32, respectively, a longitudinal axis 34 which extends between its ends, lateral edges 36 and 38, and a transverse axis 40 which intersects axis 38 at the geometric center 42 of the sheet metal member 28. Sheet metal member 28 is symmetrical about the transverse axis 40.

More specifically, sheet metal member 28 is punched to a rectangular shape which is dimensionally accurate to one thousandth of an inch, with the sheet metal member 28 including transverse slots and a plurality of pairs of tooling holes or openings. First and second transverse slots 44 and 46 are provided immediately adjacent to the first and second ends 30 and 32, respectively, and first, second, third and fourth pairs of openings 48, 50, 52 and 54, respectively, are spaced apart along the longitudinal axis 34. Each pair of openings, such as pair 48, includes first and second openings 56 and 58 which are symmetrically spaced about the longitudinal axis 34. A line drawn through the centers of the openings of each pair of openings is perpendicular to the longitudinal axis 34 and parallel with the transverse axis 40. In order to simplify the tooling and make it universally applicable to all fixtures regardless of the core window dimension it is to define, the only allowable variable between fixtures for different size magnetic cores is the spacing between pairs of tooling openings along the longitudinal axis 34. As indicated in FIG. 2 along the lower lateral edge 38, the dimension between the first end 30 and the centers of the openings of the first pair 48 is fixed, as is the the dimension between the second end 32 and the centers of the openings of the fourth pair 54. The dimension between the first and second pairs 48 and 50, and the dimension between the third and fourth pairs 52 and 54 is determined by the dimension Y shown in FIG. 1, which dimension is controlled by the height of the core window opening the fixture is to be associated with. The dimension between the second and third pairs 50 and 52 is determined by the dimension X shown in FIG. 1, which dimension is controlled by the width of the core window opening the fixture is to be associated with.

Figure 3:
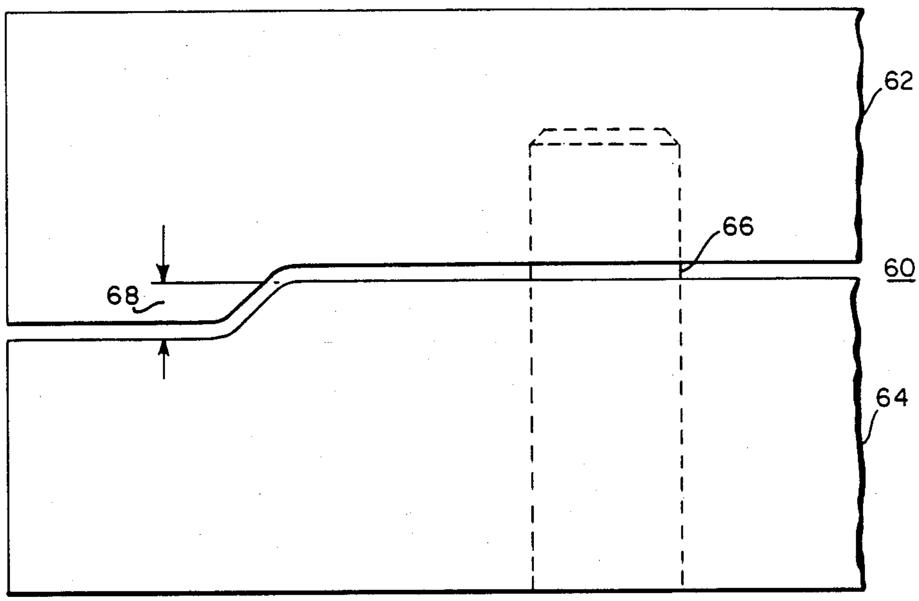
FIG. 3 is a fragmentary elevational view of tooling which may be used to provide a transverse bend or step-shaped offset in the slot portion adjacent each end of the U-frame shown in FIG. 2.

The U-shaped frame 12 includes first and second different types of bends, a step-shaped offset and a right angle bend, and these bends are made by the same first and second sets of bending tools, regardless of the physical size of the fixture. The first type of bend, the step-shaped offset, which actually includes two spaced transverse bend lines, is formed by the set 60 of bending tools shown enlarged in a side elevational view in FIG. 3. Set 60 includes upper and lower bending blocks 62 and 64, respectively, and a pair of locating pins, such as pin 66. The remaining locating pin is directly behind pin 66 in FIG. 3. The locating pins are held captive in one of the bending blocks with a press fit and they extend into the other bending block with a sliding fit. For example, as illustrated in FIG. 3, the pins may be held captive in in the lower block 64 and extend into the upper block 62 with a sliding fit.

The metallic sheet member 28 is placed in position on the lower bending block 64 with the locating pins 66 in the first pair 48 of openings, and the upper bending block then forms a step-shaped offset or joggle 69 having a predetermined offset dimension 68 and bends 70 and 71. Bend 70 extends through the transverse slot 44 to make the slot accessible from above. In like manner, a joggle 72 is formed which includes a bend which extends through transverse slot 46, using the fourth pair 54 of locating holes.

Figure 4:
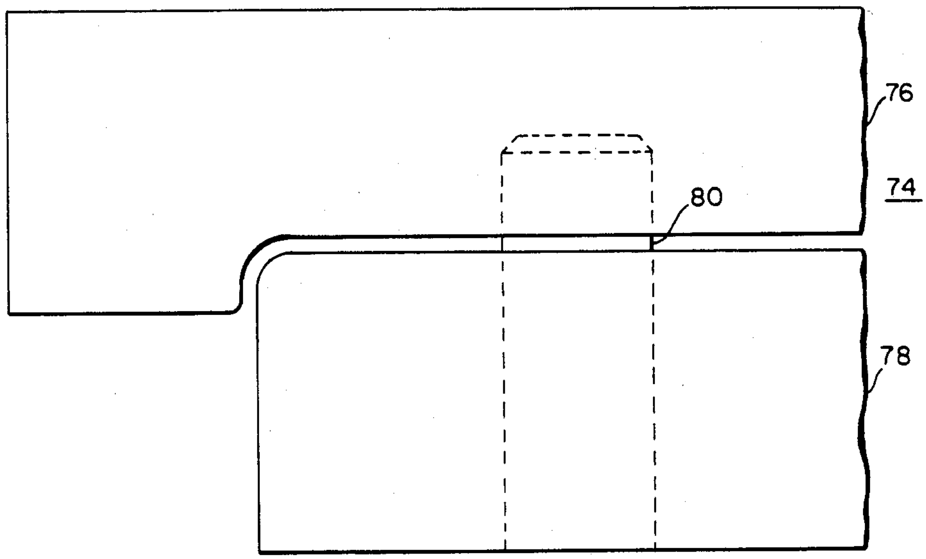
FIG. 4 is a fragmentary elevational view of tooling which may be used to provide a right-angle bend at two spaced locations in the U-frame shown in FIG. 2.

The second type of bend, the right angle bend, is formed by using the set 74 of bending tools shown in an enlarged side elevational view in FIG. 4. Set 74 includes upper and lower bending blocks 76 and 78, respectively, and a pair of locating pins, such as pin 80, with the remaining pin being directly behind pin 80 in FIG. 4. As hereinbefore explained relative to blocks 62 and 64 in FIG. 3, the locating pins are held captive in one of the blocks, such as the lower block 78, and they enter the other block (76) with a sliding fit. The second set 50 of locating holes is used to locate right angle bend 76, and the third set 52 of locating holes is used to locate right angle bend 78.

Figure 5:
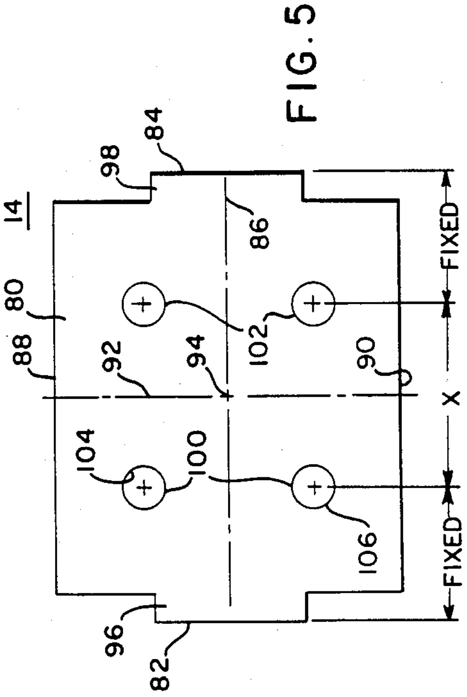
FIG. 5 is a plan view of the cap shown in FIG. 1, before it is bent into the configuration shown in FIG. 1.

FIG. 5 is a plan view of cap 14 before it is bent into the configuration shown in FIG. 1. Cap 14 is formed from a flat sheet metal member 80, such a 0.075 inch thick carbon steel. Sheet metal member 80 has first and second ends 82 and 84, respectively, a longitudinal axis 86 which extends between its ends, lateral edges 88 and 90, and a transverse axis 92 which intersects axis 86 at the geometric center 94 of the sheet metal member 80. Sheet metal member 80 is symmetrical about the transverse axis 92.

More specifically, sheet metal member 80 is punched to define a substantially rectangular shape which is dimensionally accurate to one thousandth of an inch, with the sheet metal member 80 including tongues 96 and 98 at the first and second ends 82 and 84, respectively, and first and second pairs 100 and 102, respectively, of tooling holes or openings. The first and second pairs 100 and 102 of openings are spaced apart along the longitudinal axis 86. Each pair of openings, such as pair 100, includes first and second openings 104 and 106 which are symmetrically spaced about the longitudinal axis 86. A line drawn through the centers of the openings of each pair of openings is perpendicular to the longitudinal axis 86 and parallel with the transverse axis 92. The only allowable variable between fixtures for different sizes of magnetic cores is the spacing between the first and second pairs 102 and 104 of tooling openings along the longitudinal axis 86. As indicated in FIG. 5 along the lower lateral edge 90, the dimension between the first end 82 and the centers of the opening of the first pair 100 is fixed, as is the dimension between the second end 84 and centers of the openings of the second pair 102. The dimension between the first and second pairs 100 and 102 of openings is determined by the dimension X shown in FIG. 1, which dimension is controlled by the width of the core window opening the fixture is to be associated with.

Cap 14 includes a first and second different types of transverse bends, a slight step-shaped offset or joggle, and a right angle bend, and these bends are made with the same third and fourth sets of bending tools, regardless of the physical size of the fixture. The first type of bend, the joggle, which actually includes two spaced bends, is formed by a third set of bending tools, which is similar to the first set of bending tools shown in FIG. 3, except for the magnitude of the offset dimension 68. Thus, the third set of bending tools is not illustrated in the drawings, as the first set 60 may be used to describe the formation of the joggle.

Metallic sheet member 80 is placed in position on the lower bending block 64 with the locating pins 66 in the first pair 100 of openings, and the upper bending block then forms a joggle 99 having a predetermined offset dimension 68 and the resulting transverse bends 108 and 109. Bends 108 and 109 are formed in tongue 96. In like manner, a joggle 110 is formed in tongue 98, using the second pair 102 of locating holes.

The second type of bend in cap 14, the right angle bend, is formed by using a set of bending tools similar to the set 74 shown in FIG. 4. The first set 100 of locating holes is used to locate right angle bend 112, and the second set 102 of locating holes is used to locate right angle bend 114.

Figure 6:
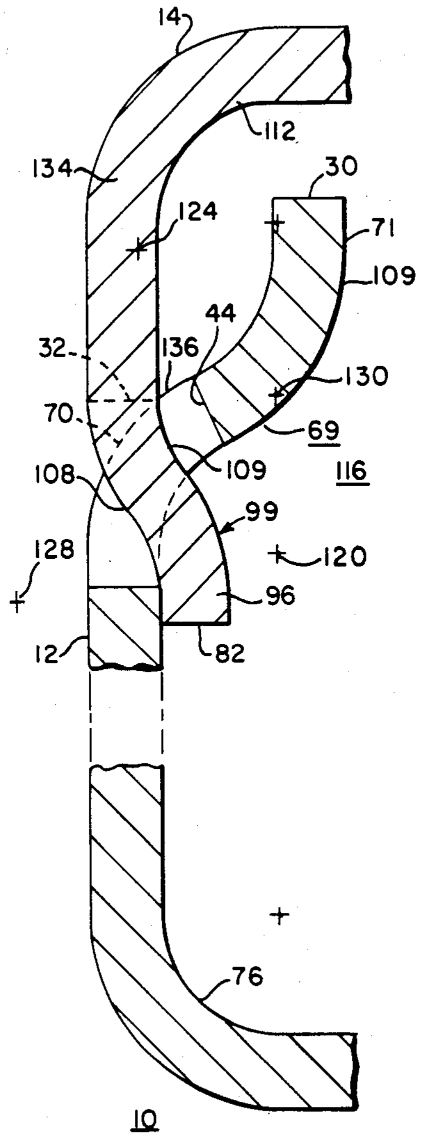
FIG. 6 is greatly enlarged view of an interlocking joint formed at the upper corners between the U-frame and cap shown in FIG. 1, when the U-frame and cap are assembled.

FIG. 6 is a greatly enlarged fragmentary view, in elevation, of fixture 10, which illustrates more clearly one of the two interlocking joints 116 and 118 which are formed when U-shaped frame 12 and cap 14 are assembled. The offset adjacent to end 30 of the U-shaped frame 12 includes the hereinbefore mentioned bends 70 and 71 which form curves having centers 122 and 124, respectively. In like manner, the offset or joggle 99 adjacent to end 82 of cap 14 includes the hereinbefore mentioned bends 108 and 109 which form curves having centers 128 and 130, respectively.

As will be readily apparent from FIG. 6, the dimensional integrity of the assembled fixture 10 is achieved by controling the depth of the joggle 99 in the tongue 96 (dimension 68 in FIG. 3). Joggle 99 provides a dual function. It prevents the spaced ends 30 and 32 of the U-shaped frame 12 from moving towards one another, notwithstanding large forces which may be applied to the fixture 10 during the formation of a magnetic core loop about the fixture. Joggle 99 also prevents the cap 14 from traveling down the curved surface having the center 120. It will be noted that the ends of the leg portions formed by the right angle bend, such as end 132 of the leg portion 134 formed on one side of tongue 96, rests against the surface 136 defined by bend 70.

Figure 7:
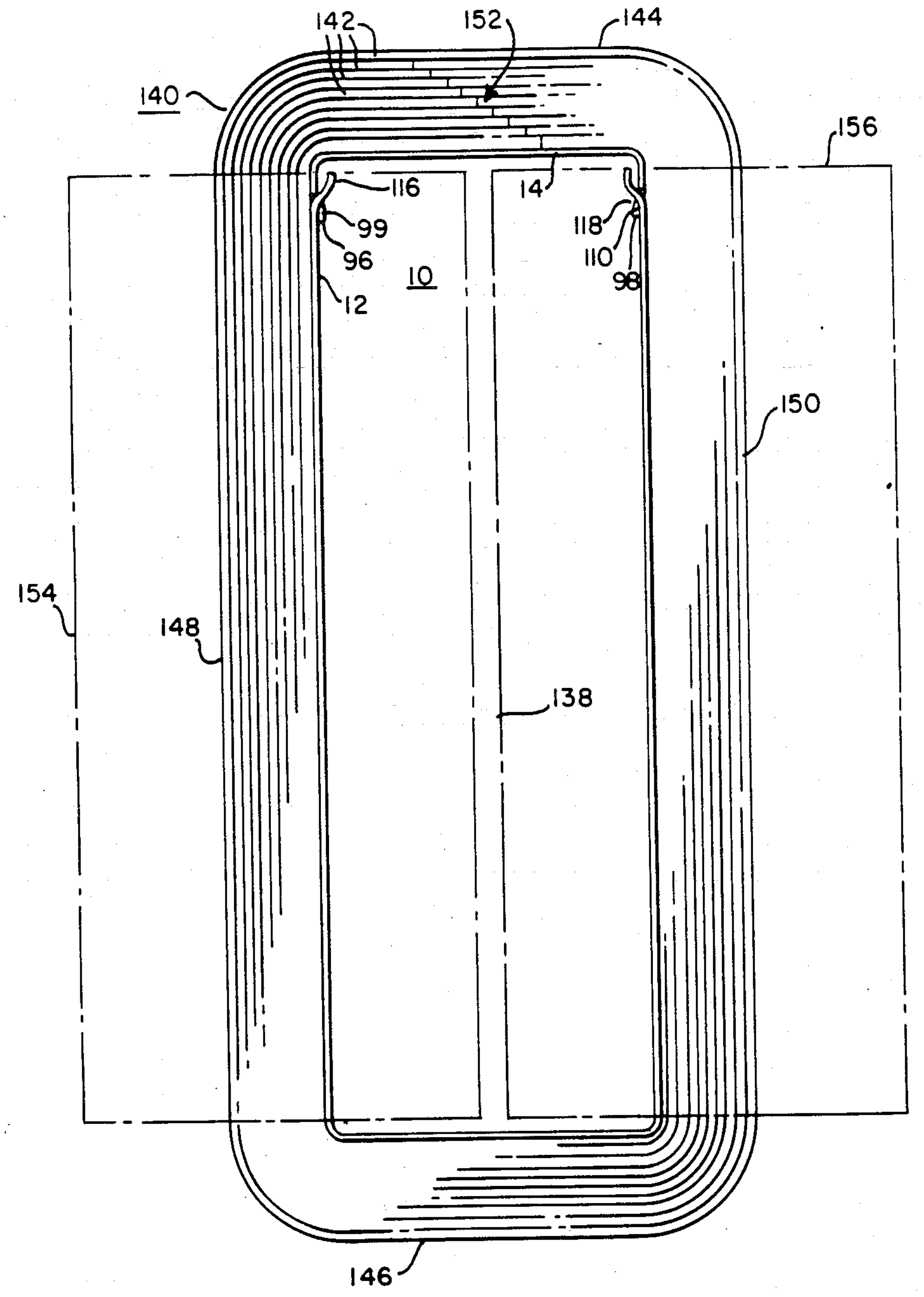
FIG. 7 is an elevational view of the fixture shown in FIG. 1 in its assembled configuration, defining the window opening in a magnetic core.

FIG. 7 is an elevational view of fixture 10 defining the core window opening 138 of a magnetic core 140. Magnetic core 140 includes a plurality of nested lamination turns 142 which have a generally rectangular configuration, which lamination turns collectively define upper and lower yoke portions 144 and 146, respectively, and first and second winding leg portions 148 and 150, respectively. Magnetic core 140 includes an openable joint 152. For purposes of example, a step-lap joint configuration having a single non-repeating stepped pattern is shown. It is to be understood that the joint 152 may have any joint pattern, which may be repeated a plurality of times across the core build.

Figure 8:
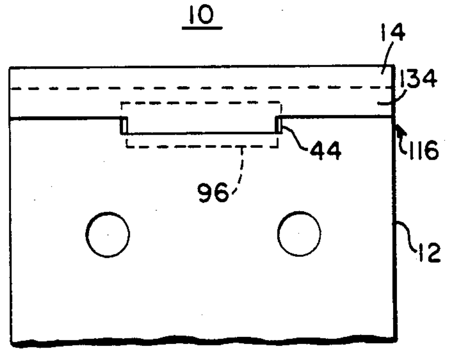
FIG. 8 is a fragmentary side elevational view of an interlocking joint formed between the U-frame and cap shown in FIG. 1.

FIG. 8 is a fragmentary elevational end view of interlocking joint 116 shown in FIGS. 6 and 7.

In the use of fixture 10, the magnetic core 140 is formed tightly about the fixture 10, after its U-shaped frame 12 and cap 14 have been assembled. While they are easily disassembled when disassembly is desired, the core forming pressure are all in a direction which forces the two frame elements 12 and 14 tightly together. The interlocking nature of joints 116 and 118, however, resists any tendency to change the peripheral dimension of the fixture 10, with the tongues 96 and 98 preventing the normally flexible leg portions 18 and 20 of the U-shaped frame 12 from bending inwardly, and with the depth of the joggle 99 accurately defining the position of end 132 on the curved surface 136, preventing the cap 14 from moving down curved surface 136 because to do so would require tongue 96 to move through the solid metallic leg portion 18 of U-shaped frame 12.

After magnetic core 140 is tightly formed about fixture 10, with the joint 152 closed, the magnetic core 140 is subjected to a stress-relief anneal heat treatment cycle, with the fixture 10 accurately holding the magnetic core 140 in the configuration it will occupy in a finished transformer. After the heat treatment cycle, the lower yoke 146 and leg portions 148 and 150 of the magnetic core are consolidated, such as by using the methods taught in the hereinbefore mentioned co-pending application. Joint 152 is then opened and cap 14 is removed from U-shaped frame 12, while the U-shaped frame 12 remains assembled with the consolidated portions of the magnetic core. Winding assemblies 154 and 156, shown in phantom in FIG. 7, are then positioned about winding legs 148 and 150, respectively, the cap 14 is reassembled with the U-shaped frame 14, and the joint 152 is reclosed. The upper yoke 144 may then be consolidated, as disclosed in the co-pending application. Reassembling the cap 14 with the U-shaped frame 12 provides exactly the same geometrical configuration and peripheral dimension as the fixture 10 exhibited prior to the initial assembly of the fixture, because of the interlocking joint arrangement which positively establishes the width and height dimensions of the core window.

I claim as my invention:

1. A method of constructing a fixture for defining the window of a magnetic core constructed of amorphous metal, while accurately dimensioning and supporting said magnetic core, comprising the steps of:

providing first and second elongated sheet metal members each having first and second ends, and a longitudinal axis which extends between said ends, providing first and second pairs of openings in said first member, said first and second pairs of openings being spaced apart along the longitudinal axis of said first member, with said spacing being a variable selected according to a window dimension of the magnetic core to be supported, and with the dimension from each pair of openings to the adjacent end of the first member being a constant, regardless of the dimensions of the core window, providing first, second, third and fourth pairs of openings in said second member, said first, second, third and fourth pairs of openings being spaced apart along the longitudinal axis of said second member, with the spacings between the pairs being variables selected according to window dimensions of the magnetic core to be supported, and with the dimension from the first and fourth pairs of openings to the respectively adjacent ends of said second member being a constant, regardless of the dimensions of the core window, providing an elongated tongue at each of the first and second ends of one of said members, and an elongated transversely extending slot adjacent to each of the first and second ends of the other of said members dimensioned to receive a tongue, providing an offset joggle in each of said tongues having a predetermined dimension, using a predetermined pair of openings to position each joggle, bending the member having the slots, using pairs of openings to locate the bends, such that each of said slots is located on a radius of a bend, providing a pair of spaced right angle bends in each of said first and second members, using a predetermined pair of openings to locate each bend, to define substantially U-shaped configurations for each of said first and second members, and assembling the first and second members such that the offset joggle of the tongued member enter the slots and rigidly supportingly engage the inner wall of the slotted member, with the predetermined dimension of the joggle controlling the position of the tongued member on the radii of the bends which extend through the slots of the slotted member, as well as controlling the dimension between the ends of the slotted member by preventing said ends from moving towards one another.

2. The method of claim 1 wherein the step of providing a tongue at the first and second ends of one of the members selects the first member, and step of providing a slot adjacent to the first and second ends of the other member selects the second member.

3. The method of claim 2 wherein each of the first and second pairs of openings in the first member control the location of a tongue and the location of a right angle bend, and the spacing between the first and second pairs of openings is responsive to the width dimension of the core window.

4. The method of claim 2 wherein the first and fourth pairs of openings each control the location of a bend through a slot, the second and third pairs of openings each control the location of a right angle bend, the spacing between the first and second pairs of openings and the spacing between the third and fourth pairs of openings are responsive to the height dimension of the core window, and the spacing between the second and third pairs of openings is responsive to the width dimension of the core window.

* * * * *